Oct. 22, 1940.  J. H. YOUNG ET AL  2,218,965
COMPOSITE FIREPROOFING MEMBER
Filed May 13, 1938

INVENTORS
James Howard Young
BY Paul W. Jenkins
J. Stanley Churchill
ATTORNEY

Patented Oct. 22, 1940

2,218,965

UNITED STATES PATENT OFFICE 2,218,965

COMPOSITE FIREPROOFING MEMBER

James Howard Young and Paul W. Jenkins, Pittsburgh, Pa., assignors to H. H. Robertson Company, Pittsburgh, Pa., a corporation of Pennsylvania Application May 13, 1938, Serial No. 207,721

2 Claims. (Cl. 72—67)

This invention relates to a fireproofing tile, block or slab.

The object of the invention is to provide a novel fireproofing tile, block or slab which may be economically manufactured and used with advantage in the construction of ceilings, walls and other parts of a building. The improved fireproofing tile, block, or slab possesses efficient fire-resistive characteristics and is of reduced sectional dimension as compared with commonly used fireproofing tile, block or slabs having comparable fire resistance.

With this general object in view and such others as may hereinafter appear, the invention consists in the building block hereinafter described and particularly defined in the claims at the end of this specification.

Figure 1:
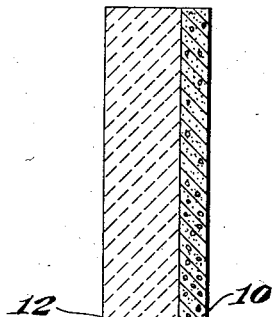
Figure 2:
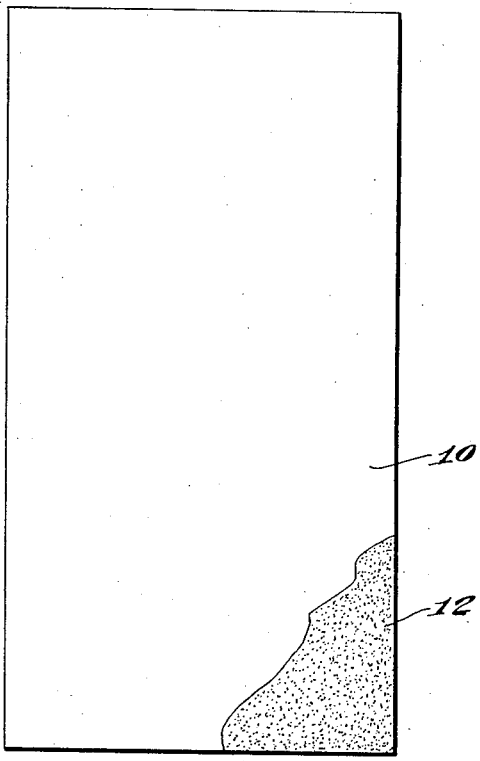
Figure 3:
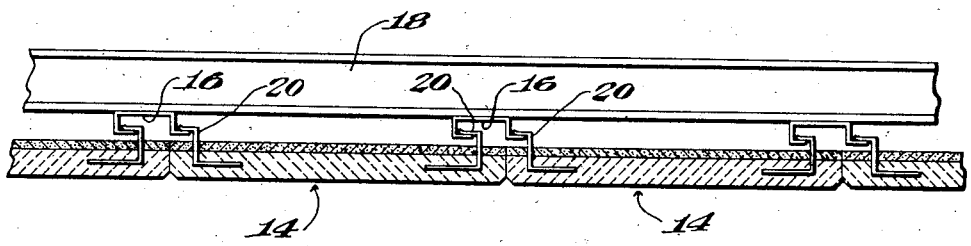

In the drawing illustrating the preferred embodiment of the invention, Fig. 1 is a cross-sectional view of a building block embodying the present invention; Fig. 2 is a front elevation of the same with a portion broken away; and Fig. 3 is a view in cross-section illustrating the use of the present blocks as ceiling tiles.

In general the present invention contemplates a precast fireproofing tile, block or slab comprising two layers bonded together to form a unitary structure. One layer comprises a body of unexpanded vermiculite which has been reduced to convenient size and mixed with gypsum, silicate of soda, Portland cement, magnesium oxysulphate cement, or other suitable cementitious binder to form a layer which under normal temperature conditions may be relatively thin and compact but which under fire conditions automatically expands to form an efficient insulating and fireproofing layer of substantially greater thickness. The thin vermiculite layer is bonded to a relatively thicker layer of suitable facing material which forms the structural member of the tile, block or slab and which preferably is a material capable of withstanding temporary fire exposure temperatures without appreciable disintegration.

As herein shown, 10 represents a layer of material such as gypsum or like cementitious binder having dispersed throughout the mass thereof a substantial quantity of unexpanded vermiculite. The layer 10 may and preferably will comprise a thin layer and in practice I have experienced satisfactory results with layers in the neighborhood of ½-inch thickness. It will be understood that the thickness of this layer may be varied according to particular fire-resistive requirements. The vermiculite layer 10 is preferably cast upon the main body portion 12 and the latter may be one of a number of relatively refractory materials such as fired clay, cinder concrete, bloated cement, porous lime-silica compositions, and the like which are capable of maintaining the structural function of this layer during exposure to fire and this layer is preferably of a thickness of the order of 1 inch. In practice, I prefer to utilize a material of as low a density as possible as the main body portion 12 in order to hold the weight of the composite fireproofing member to a minimum and preferably a material which presents a satisfactory surface requiring no further treatment when the composite tile, block or slab is embodied in a wall, ceiling or like construction. The main body portion of the composite fireproofing member may be a material having a high coefficient of sound absorption and I have demonstrated the utility of such a form of the fireproofing member when made with several acoustical tile compositions as the main body portion. It will be understood that the nature of the material employed as the main body layer will be governed by the particular use for which the composite tile, block or slab is intended.

One feature of the present invention resides in the fact that the composite fireproofing member may be made considerably thinner in cross-section and yet possesses fire-resistive properties equivalent to those of relatively thicker sections of prior fireproofing materials. In practice it was found that a substantial thickness of the contemplated refractory materials when used alone was required to provide the desired fire protection. In the present composite fireproofing member the combination of a vermiculite sheet with the refractory material enables relatively thinner slab sections to be used than would be required with a refractory material alone.

As an example of the present fireproofing member I may employ a 1-inch thickness of burnt clay tile as the main body portion capable of being finished on the exposed surface thereof as by plastering after the composite member is in place as a unitary part of a wall construction. On the unexposed surface of this main body portion I may cast a ½-inch thick layer of unexpanded vermiculite which was reduced to an initially plastic state by the addition of sodium silicate solution in amount equivalent to approximately 20 percent of the weight of the unexpanded vermiculite. I have demonstrated the ability of the main body portion of burnt tile to remain intact during a temporary exposure fire of 4-hour duration and of the vermiculite layer to expand to form a substantially thicker insulating layer capable of maintaining the temperature on the unexposed surface of the member within safe limits during the exposure and considerably lower than would be maintained by a 1½-inch thickness of the burnt clay tile alone.

I have demonstrated the utility of the present fireproofing member in the form of a composite tile comprising a main body portion of the commercial acoustical product known as Berry-Cel combined with a ½-inch thick layer formed from an initially plastic mixture of 80 parts by weight of unexpanded vermiculite and 20 parts by weight of gypsum molding plaster. I may likewise employ bloated or puffed cement as the main body layer combined with a layer of unexpanded vermiculite bonded with Portland cement. In these forms of the invention the main body portion presents a surface of desirable characteristics to exposure and the vermiculite layer provides the degree of fire resistance not obtainable with economical thicknesses of the main body layer alone.

In the embodiment of the invention illustrated in Fig. 3, the slabs 14 of the material are used as a ceiling tile and as herein shown, are suspended from the ceiling upon supporting members 16 which may be welded or otherwise secured to the structural member 18. As herein illustrated the hooks 20 may be cast in the slab and successive units are suspended in such a manner that the members abut one another to form a continuous ceiling. In the event of a fire, when the vermiculite is subjected to heat, it is expanded to fill up the space between the refractory material and the structural members to form an insulating barrier for the protection of the structural members.

The improved composite fireproofing member fulfills the desired functions of a refractory fireproofing material with a much thinner overall slab section than would otherwise be required. The refractory member of the composite slab supplies the characteristics desirable for resistance to fire exposure temperatures upon the outer surface and the vermiculite layer supplies the thermal insulation required for protection if and when the composite slab is called upon to fulfill its fireproofing functions.

Having thus described the invention, what is claimed is:

1. A building and fireproofing block comprising a block of fire resistive material of substantial thickness and strength provided upon one surface thereof with an appreciably thinner layer embodying sufficient unexpanded vermiculite to be capable upon expansion under fire conditions of forming a relatively thick insulating and fire resisting layer capable of maintaining the temperature on the unexposed surface of the block within safe limits.

2. A building and fireproofing block comprising a block of fire resistive material of substantial thickness and strength having one surface formed to possess efficient sound absorbing properties and upon its opposite surface provided with an appreciably thinner layer embodying sufficient unexpanded vermiculite to be capable upon expansion under fire conditions of forming a relatively thick insulating and fire resisting layer capable of maintaining the temperature on the unexposed surface of the block within safe limits.

JAMES HOWARD YOUNG.
PAUL W. JENKINS.